Patented Aug. 7, 1928.

1,680,047

UNITED STATES PATENT OFFICE.

JOHN Y. HUBER, JR., OF ARDMORE, PENNSYLVANIA.

STABILIZATION OF OILS, FATS, AND WAXES.

No Drawing.    Application filed February 4, 1924.  Serial No. 690,667.

This invention relates to the stabilization of oils, fats and waxes, and the principal object of the invention is to provide novel and advantageous means for preventing the changes in these bodies which result in deterioration of what is known as rancidity.

It is generally known that substances such as formaldehyde, sodium benzoate, borax, and salicylic acid may be used for preserving purposes, but due to the fact that they are non-miscible with oils, fats and waxes, they are not suited for use as stabilizers with these substances.

I have discovered a practical method of stabilizing oils, fats, waxes and the like by addition thereto of a substance having properties such that it lends itself readily to the formation, with said oils, fats and waxes, of a homogeneous mass, and which so affects those elements responsible for deterioration and the development of rancidity as to render them innocuous.

More specifically, I have discovered that furfural, possessing exceptional stabilizing properties, is by reason of its oily nature readily miscible with fats, oils and waxes, and that it possesses in marked degree the requisites of a stablizer for these substances. Furfural retains its effectiveness over comparatively long periods of time, and when added to the bodies in sufficient quantities and thoroughly incorporated therein is capable of maintaining the stability thereof over comparatively long periods of time. It is, generally speaking, desirable to use small amounts of this or any other stabilizer, and exceedingly small amounts of furfural may be used with great effectiveness. I have obtained, for example, highly satisfactory results by employing 1 part of furfural to 10,000 parts of the fat or oil which I desire to stabilize. Even smaller amounts may be employed with success, and furfural may be used in larger proportions where it is desired to maintain the stability of the fat or oil over long periods of time.

It will be understood that furfural may be used not only in admixture with the fats, oils, and waxes for the preservation of free bodies of these substances, but may be used also with mixtures of compounds and with bodies which naturally or otherwise comprise these substances, where it is desired to obtain stabilized effects and to retard the development of rancidity.

In utilizing furfural for stabilizing oils, fats and waxes, either as isolated bodies or in association with others, it is desirable to thoroughly incorporate the furfural and to obtain as homogeneous a mixture as possible. With isolated bodies of oils, fats and waxes, the mixture may ordinarily be accomplished by stirring or otherwise agitating the mass after introduction of the furfural, although other methods may be used. Where the oil, fat, or wax is an ingredient of a compond, the furfural may be introduced either before or after inclusion of the said substances. Or the furfural may be mixed with another of the ingredients of the compound, or may be added separately to the mixture. Where the oil, fat, or wax is a natural element of the body, the furfural may, if necessary, be applied under pressure or in atomized or vaporous form.

Although the invention may find its most useful application in the stabilization of fats, oils, and waxes, both animal and vegetable, and to compounds containing these bodies, I do not desire to limit myself to use with these classes of substances alone. It may for example find useful application in the stabilization of mineral oils.

I further do not wish to limit the invention to any proportions of the furfural and the stabilized bodies, since the proportions may vary largely and in the main will be controlled by the requirements of the particular case, the nature of the body stabilized, the extent of the period over which the stabilization is to continue, and the conditions as to temperature, etc., to which the stabilized bodies are subjected.

Furfural finds, among others, a useful application in preservation of butter and powdered milk, particularly powdered milk rich in butter fat. In the latter case, the furfural may be introduced into the milk prior to dehydration. It will also be understood that the invention extends to the stabilization of products containing oils, fats or waxes which in course of manufacture are subjected to heat treatments, such as bakery and like products.

I am aware that aldehydes as a class are known and have been employed as preservatives, but so far as I am aware, furfural has never, prior to my invention, been employed for stabilizing fats, oils, waxes and like bodies; nor has it been known, prior to my invention, that by reason of characteristics peculiar to this particular aldehyde, the latter lends itself particularly well to the stabilization of bodies of this class.

By the expression "fats, oils and waxes", I mean all such materials of animal and vegetable derivation; and the term "fatty materials" employed in the claims is to be understood as coextensive in scope and embracing generally all fats, oils and waxes of animal and vegetable derivation.

I claim:

1. As a new article of manufacture, a fatty material and furfural in the relative proportions by weight of 10,000 to 1, respectively.

2. The method of stabilizing food products containing fatty material, which consists in adding thereto furfural in amounts insufficient to affect the flavor of said products.

3. As a new article of manufacture, a food product containing fatty material and a stabilizer in the form of furfural in amount insufficient to affect the flavor of said product.

JOHN Y. HUBER, Jr.

DISCLAIMER 1,680,047.—*John Y. Huber, Jr.*, Ardmore, Pa. STABILIZATION OF OILS, FATS, AND WAXES. Patent dated August 7, 1928. Disclaimer filed May 27, 1937, by the patentee.

Hereby enters this disclaimer to all of the claims, namely, 1, 2, and 3 of said Letters Patent.

[*Official Gazette, June 22, 1937.*]